United States Patent [19]
Earhart et al.

[11] Patent Number: 5,937,520
[45] Date of Patent: *Aug. 17, 1999

[54] METHOD OF ASSEMBLING FUEL INJECTOR PUMP COMPONENTS

[75] Inventors: Thomas E. Earhart, Middleville; Allan J. Vanden Berg, Zeeland, both of Mich.

[73] Assignee: Diesel Technology Company, Wyoming, Mich.

[*] Notice: This patent is subject to a terminal disclaimer.

[21] Appl. No.: 08/977,755

[22] Filed: Nov. 25, 1997

Related U.S. Application Data

[63] Continuation-in-part of application No. 08/763,134, Dec. 10, 1996.

[51] Int. Cl.⁶ .................................................. B21K 1/24
[52] U.S. Cl. .............................................. 29/890.13; 29/517
[58] Field of Search ..................... 29/890.13, 890.126, 29/890.124, 517

[56] References Cited

U.S. PATENT DOCUMENTS

| | | | |
|---|---|---|---|
| 3,189,672 | 6/1965 | Lyman, Jr. ............................... | 264/249 |
| 3,261,909 | 7/1966 | Rust et al. ............................. | 174/153 R |
| 3,577,850 | 5/1971 | Harris, Sr. .............................. | 29/510 |
| 4,618,095 | 10/1986 | Spoolstra ................................ | 239/90 |
| 5,333,836 | 8/1994 | Fukuyo et al. ..................... | 251/129.15 |
| 5,815,920 | 10/1998 | Earhart ................................. | 29/890.13 |

*Primary Examiner*—Henry C. Yuen
*Assistant Examiner*—Hai Huynh
*Attorney, Agent, or Firm*—Brooks & Kushman P.C.

[57] ABSTRACT

Methods of swaging fuel injector pump components are provided. A method of securing an armature plate to a control valve of a solenoid-actuated fuel injector pump comprises: (1) providing a control valve stem extending from the control valve, the stem having a body with a body width, a head with a head width narrower than the body width, and a neck with a neck width narrower than the head width, the neck forming an annular groove between the head and body; (2) providing a central aperture formed in the armature plate having an aperture width between the head and body widths; and (3) forcing the stem into the central aperture in a manner to cause a portion of the armature plate to deform into the groove to secure the armature plate to the stem. Also provided is a method of plugging a fuel flow passage in a fuel injector pump body, comprising: (1) providing a plug; (2) inserting the plug at least partially into the passage; and (3) swaging the plug into the passage in a manner to deform a portion of the pump body around the plug to secure the plug in the passage.

2 Claims, 6 Drawing Sheets

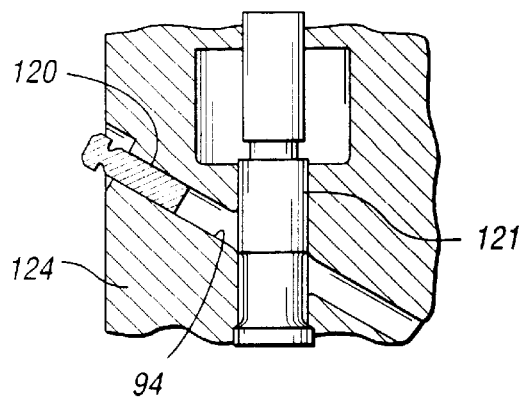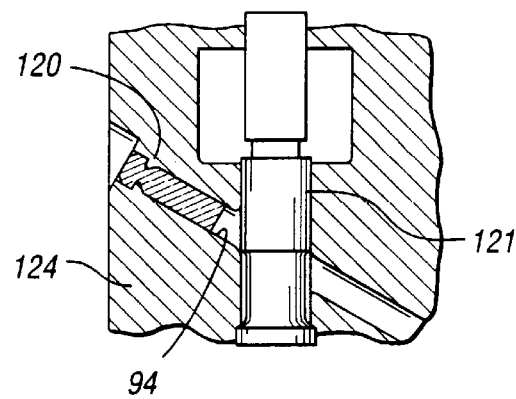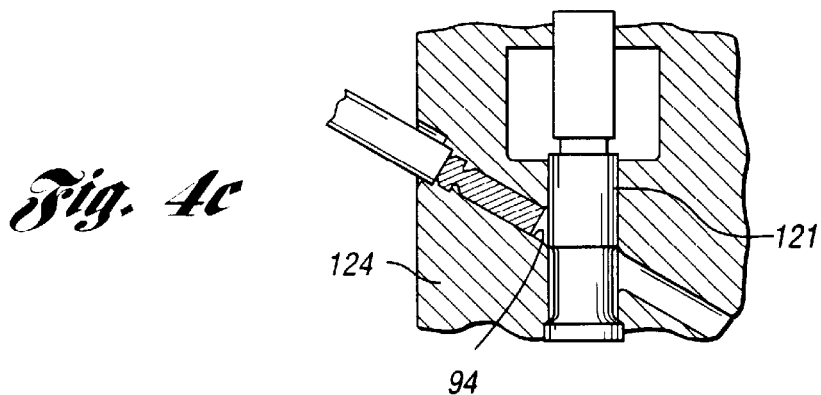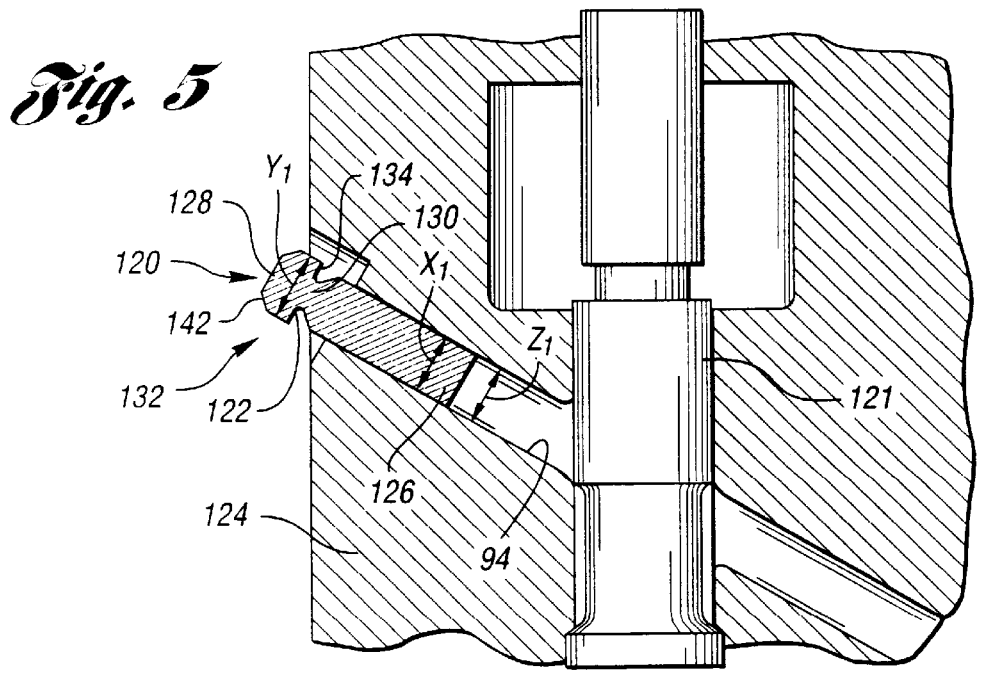

METHOD OF ASSEMBLING FUEL INJECTOR PUMP COMPONENTS

CROSS-REFERENCE TO RELATED APPLICATION

This patent application is a continuation-in-part of copending U.S. patent application Ser. No. 08/763,134, filed on Dec. 10, 1996, which is hereby incorporated by reference in its entirety.

TECHNICAL FIELD

The present invention relates to methods of swaging adjacent fuel injector pump components, and more specifically to methods of plugging a fuel flow passage and securing an armature plate to a control valve.

BACKGROUND OF THE INVENTION

Solenoid actuated unit injectors for controlling the admission of fuel to diesel engines, particularly heavy duty trucks and marine engines, have been in common use for a number of years. Early on, the fuel control valve for admitting fuel to the pressure chamber of these devices was mechanically actuated. In more recent years, the solenoid actuated control valve has become more popular and useful in light of its quick action and the fact that it can be easily and accurately programmed with current electronically controlled engines and software systems.

In a solenoid actuated unit injector or unit pump or common rail fuel system, there is provided an electromagnetic coil for energizing an armature which is attached to a fuel control valve, which admits fuel to a pressure chamber (either in the pump or in the injector body depending upon the device). Most commonly, the control valve with attached armature plate is spring biased to a normally open position with the electromagnetic coil being in an unenergized state. Upon energization of the electromagnetic coil, a control valve, in the form of a sliding reciprocating valve, is closed momentarily until the electromagnetic coil is next de-energized. Also, the chamber or cavity within which the armature resides is fuel-filled to provide equalization of pressure on all sides of the reciprocating fuel control valve and to allow a certain degree of damping of the action of the armature plate as the electromagnetic coil is repeatedly energized and de-energized. This also helps control valve balance which refers to the action of the control valve returning home on its valve seat as the valve is closed.

In the above-referenced systems, it is common to secure the armature plate to the control valve by means of a flathead counter-sunk screw in such a manner that the screw head faces the surface of the armature that is exposed to the electromagnetic coil and the screw shank is embedded within the control valve.

A further problem experienced with the prior art fuel injection pump assemblies is the difficulty of plugging the ends of fuel flow channels. These fuel flow channels are typically drilled through the body from the sides of the body, and therefore require plugging at the end in which the drill bit entered the body. These flow channels are typically plugged by providing a tapered flow channel, and inserting a tapered plug in the channel. A ring of high temperature solder is placed in the channel adjacent the tapered plug, and the solder melts as the assembly is heat treated. The solder secures the plug in the channel. This process can be unduly costly for the manufacturer.

SUMMARY OF THE INVENTION

The present invention overcomes the above-referenced shortcomings of prior art fuel pumping assemblies by providing a method of swaging an armature plate to a control valve, and a further method of swaging a plug into a fuel flow passage.

A first aspect of the present invention provides a method of securing an armature plate to a control valve of a solenoid actuated fuel injector pump. The method comprises:

a. providing a control valve stem extending from the control valve, the stem having a body with a body width, a head with a head width narrower than the body width and a neck with a neck width narrower than the head width, the neck forming an annular groove between the head and body;

b. providing a central aperture formed in the armature plate having an aperture width between the head and body widths; and c. forcing the stem into the central aperture in a manner to cause a portion of the armature plate to deform into the groove to secure the armature plate to the stem.

Another aspect of the present invention provides a method of plugging a fuel flow passage in a fuel injector pump body, the fuel flow passage having a passage width. The method comprises:

a. providing a plug;

b. inserting the plug at least partially into the passage; and c. swaging the plug into the passage in a manner to deform a portion of the pump body around the plug to secure the plug in the passage.

Accordingly, an object of the present invention is to provide a method of securing an armature plate to a control valve.

A further object of the present invention is to provide a method of swaging an armature plate to a control valve.

Yet another object of the present invention is to provide a method of plugging a fuel flow passage in a fuel injector pump in a manner in which manufacturing costs are reduced.

A still further object of the present invention is to provide a method of swaging a plug into a fuel flow passage in a fuel injector pump.

The above object and other objects, features and advantages of the present invention are readily apparent from the following detailed description of the best modes for carrying out the invention when taken in connection with the accompanying drawings.

BRIEF DESCRIPTION OF THE DRAWINGS

FIG. 4a shows a cut-away sectional schematic view of a plug with its shaft portion inserted into a fuel inlet passage;

FIG. 4b shows a cut-away sectional schematic view of the plug punched into the flow passage and a portion of the body being deformed into the annular groove;

FIG. 4c shows a cut-away sectional schematic view of the plug punched further into the annular passage in a manner to deform a further portion of the body around the annular chamfer of the plug head;

FIG. 5 shows an enlarged cut-away sectional schematic view of the assembly corresponding with FIG. 4a;

DETAILED DESCRIPTION OF THE PREFERRED EMBODIMENTS

Figure 1:
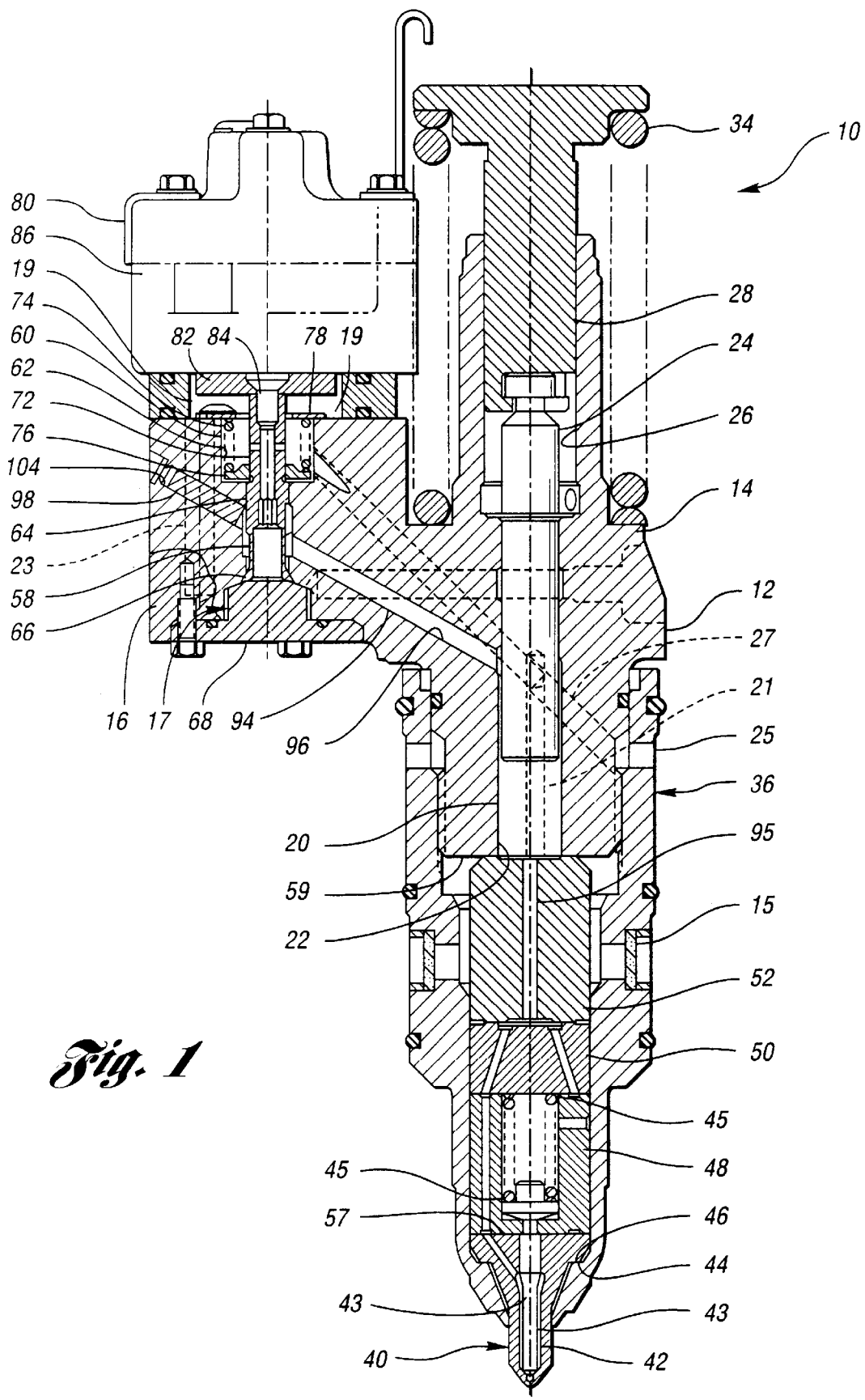
FIG. 1 is a longitudinal sectional view of a conventional electromagnetic unit fuel injector of the type in which the present invention may be incorporated into the armature plate, control valve and fuel flow passage.

Referring now to FIG. 1, there is generally shown at 10, an electromagnetic fuel injector in which the present invention may be incorporated into the armature plate, control valve and fuel flow passages. More specifically, a fuel injector pump assembly 10 is shown in the Figures having an electromagnetically actuated, pressure-balanced control valve incorporated therein to control fuel discharge from the injector portion of the assembly 10 in a manner to be described.

As illustrated in the drawings, the electromagnetic fuel injector assembly 10 includes an injector body 12 which has a vertical main body portion 14 and a side body portion 16. The main body portion contains a stepped, cylindrical bore 20 therethrough. The stepped, cylindrical bore 20 includes a cylindrical lower wall 22 which slidably receives a pump plunger 24. In addition, the stepped, cylindrical bore 20 includes an upper wall 26 of larger internal diameter to slidably receive a plunger actuator follower 28. The plunger actuator follower 28 extends out one end of the main body 14 whereby it and the pump plunger 24 connected thereto are adapted to be reciprocated by an engine driven cam or rocker as conventionally known in the art.

A nut, generally indicated at 36, is threaded to the lower end of the main body portion 14 and forms an extension thereof. The nut 36 has an opening at its lower end through which extends the lower end of a combined injector valve body or nozzle assembly, generally indicated at 40. The nozzle assembly includes a spray tip 42. The spray tip 42 is enlarged at its upper end to provide a shoulder 44 which seats on an internal shoulder 46 provided by the through counterbore in the nut 36. Between the spray tip 42 and the lower end of the main injector body 14, there is positioned in the nozzle body 40, in sequence starting with the spray tip 42, a rate spring cage 48, a spring retainer 50 and a director cage 52. As illustrated in FIG. 1, these elements are formed as separate parts for ease of manufacturing and assembly. The nut 36 is provided with internal threads for mating engagement with the external threads at the lower end of the main body portion 14. The threaded connection of the nut 36 to the main body portion 14 holds the spray tip 42, rate spring cage 48, spring retainer 50 and director cage 52 clamped and stacked end-to-end between the upper face 57 of the spray tip 42 and the bottom face 59 of the main body portion 14. All of these above-described elements have lapped mating surfaces whereby they are held in pressure sealed relation to each other.

The delivery of fuel from a source such as a fuel tank to the nozzle assembly 40 is controlled by means of a solenoid actuated, pressure-balanced valve, generally indicated at 58 in the side body portion 16. The side body portion 16 is provided with a stepped vertical bore, generally indicated at 60, which defines a supply chamber 62 and an intermediate or valve stem guide portion 64. The valve 58 is received within the steppe d vertical bore 60 and includes a head 66 which seats against a closure cap 68. The closure cap 68 is mounted to the underside of the side body portion 16 and in connection therewith forms a spill chamber (not shown). The valve 58 also includes a stem 72 extending upward from the head 66. The valve 58 is normally biased in a valve opening direction, downward with reference to FIG. 1, by means of a coil spring 74 which loosely encircles valve stem 72. One end of the spring 74 abuts against a washer-like spring retainer 76 is encircling the valve stem portion 72.

The other end of the spring 74 abuts against the lower face of a spring retainer 78. Movement of the valve 58 in the valve closing direction, upward with reference to FIG. 1, is affected by means of a solenoid assembly, generally indicated at 80. The solenoid assembly 80 includes an armature 82 having a stem 84 depending centrally from its head. The armature 82 is secured to the valve 58.

The solenoid assembly 80 further includes a stator assembly having an inverted solenoid case 86. A coil bobbin, supporting a wound solenoid coil and a segmented multipiece pole piece, are supported within the solenoid case 86 as is commonly known in the art. The solenoid coil may be energized as a function of the operating conditions of the engine in a manner well known in the art.

The high pressure fuel passage, generally indicated at 94, provides fluid communication between the control valve 58 and the fuel nozzle assembly 40. As shown in FIG. 1, the fuel passage 94 is formed by drilling a hole from one side of the side body portion 16 of the injector body 12 and between the control valve 58 and the stepped cylindrical bore 20. In this way, the fuel passage 94 defines a delivery portion 96 extending between the control valve 58 and the stepped cylindrical bore 20 and a stub portion 98 extending between the valve stem portion 64 in the control valve 58 and the side body portion 16.

Operation of injector 10 will now be described with reference to FIG. 1. During engine operation, fuel is supplied at a predetermined supply pressure by a pump (not shown) or from a fuel inlet passage in the engine head (not shown) to the injector 10. The fuel flows at a relatively low pressure into the chamber 62 surrounding control valve spring 74, into armature cavity 19, and into the chamber 17 surrounding closure cap 68. The fuel typically flows between the chambers via other internal passageways such as passageways 21 and 23. Excess fuel is vented through an outlet 25, such as by passageway 27, which typically communicates with a fuel outlet passage in the engine head (not shown). It will be appreciated that during operation, fuel can flow in either direction between the armature cavity 19 and the supply inlet 15 through passage 21.

Fuel is likewise supplied at a relatively low pressure through passage 94 into pumping chamber 20 whenever control valve body 72 is moved into contact with closure cap 68. It will be appreciated that it is well known to those skilled in the art to provide suitable internal passageways within the pump as required to supply fuel at low pressure as described above.

An actuator, such as a typical push rod and rocker arm assembly connected to the cam shaft, drives the plunger 24 downward on a pump stroke. The solenoid coil energizes at a predetermined time during the downward stroke to move the control valve body into contact with the body seat to pressurize the fuel within the pump chamber 20 as well as associated passages 94 and 95. This pressure rises to the "pop" pressure required to lift the injection valve 43 against the force of its associated return spring 45. This pressure continues to rise above the "pop" pressure as the plunger is driven downward while fuel is forced through the nozzle passages into the engine combustion chamber.

When desired, the solenoid coil is de-energized thereby opening the control valve to relieve the pressure and thereby close the injection valve 43 to end the fuel injection event. The control valve is controlled by the solenoid coil driven electromagnetic actuator to provide the pressurized fuel as and when required to be directed through nozzle outlet passages of the injector.

The injector 10 as thus far described is similar in construction and operation to that described in U.S. Pat. Nos. 4,618,095 and 5,443,209.

With the injector pump environment thus described, the methods for use in accordance with the present invention are described below.

Figure 2:
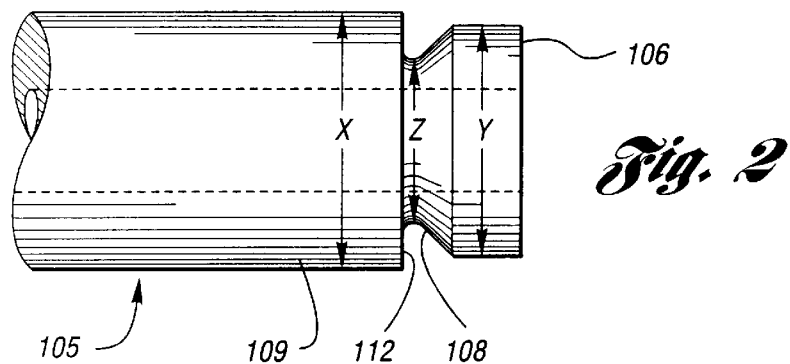
FIG. 2 shows a cut-away side view of an upper valve stem for a control valve in accordance with the present invention.
Figure 3A:
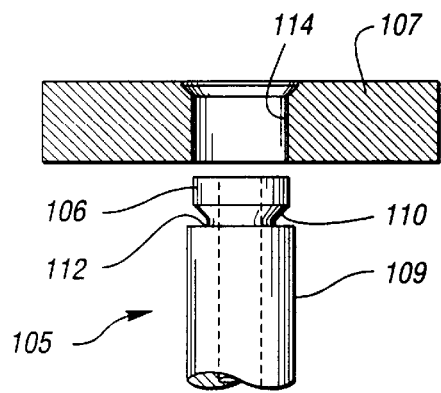
FIG. 3a shows the upper valve stem of FIG. 2 moving towards an armature plate.
Figure 3B:
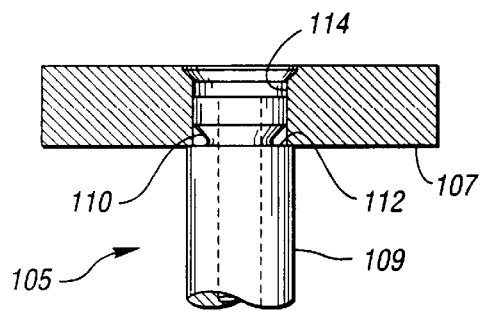
FIG. 3b shows the upper valve stem of FIG. 2 having its head portion inserted into the central aperture of the armature plate.
Figure 3C:
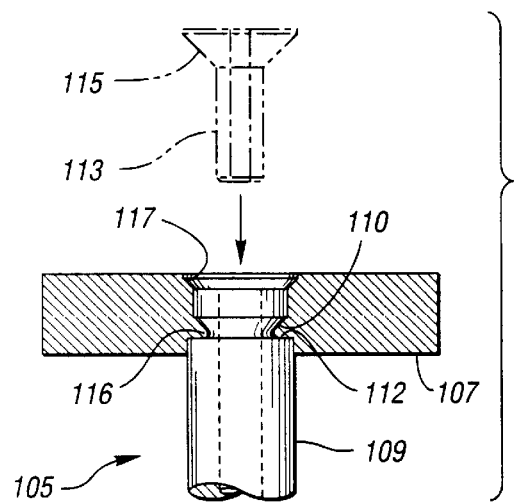
FIG. 3c shows the upper valve stem of FIG. 2 swaged into the armature plate with an optional attachment screw shown in phantom.

Turning to FIG. 2, a control valve 105 for use in accordance with a first aspect of the present invention is shown. The control valve 105 is swaged to the armature plate 107, as illustrated in FIGS. 3a–c. The control valve 105 includes a body 109 having a body width X, a head 106 with a head width Y narrower than the body width X, and a neck 108 with a neck width Z narrower than the head width Y. The neck 108 forms an annular groove 110 between the head 106 and stem 109. The stem 109 has a cross-sectional area approximately 20% greater than that of the head 106, and thus forms an annular edge 112 adjacent the neck 108.

The control valve stem 109 is preferably a tool steel, and the armature plate 107 is preferably a soft iron material. The armature plate 107 includes a central aperture 114 formed therethrough having a diameter sized for a slip-fit relationship with the head 106 of the control valve 105.

In order to swage the control valve 105 to the armature plate 107, the head 106 is first slid into the central aperture 114, as illustrated in FIGS. 3a-b. A hydraulic press is provided to force the control valve stem 109 further into the central aperture 114 of the armature plate 107. As illustrated in FIG. 3c, the control valve stem 109 is further forced toward the armature plate in a manner such that the annular edge 112 of the stem 109 of the control valve deforms a portion 116 of the soft metal armature plate 107 into the annular groove 110 in a manner to secure the armature plate 107 to the control valve 105. An optional screw 113 is shown in phantom in FIG. 3c for further attachment of the armature plate 107. The screw 113 has a head 115 which is mateable with the counterbore 117 in the armature plate 107. The features of the screw may vary, such as a solid shank, a hollow shank, an external threaded shank, a straight shank or a tapered or a stepped shank.

The options of hollow contral valve or solid control valve and hollow screw or solid screw provide optimum methods of assembly and optimum design selection for the fuel injector function.

A second aspect of the present invention is shown in FIGS. 4–10. FIGS. 4a–c illustrate a method of plugging a fuel flow passage, such as supply/drain fuel passage 94 of FIG. 1, in a fuel injector pump body in accordance with the present invention. The method comprises the steps of: (a) providing a plug 120; (b) inserting the plug 120 at least partially into the fuel flow passage 94 adjacent the control valve 121; and (c) swaging the plug 120 into the fuel flow passage 94 in a manner to deform a portion of the pump body 124 around the plug 120 to secure the plug 120 in the passage 94.

As clearly shown in FIG. 5, the plug 120 preferably includes a shaft portion 126 having a shaft width $X_1$, a head portion 128 having a head width $Y_1$ greater than the passage width $Z_1$, and a neck portion 130 forming an annular groove 122 between the head and shaft portions 128,126. The head portion 128 forms an annular edge 134 therearound adjacent the neck portion 130.

The plug 120 is preferably a tool steel such as M10 or M50. The pump body 124 is preferably a deformable heat-treated steel.

As shown in FIG. 5, the shaft portion 126 has a slip-fit relationship with the fuel flow passage 94 so that the shaft portion 126 may be slid into the passage 94 until the annular edge 134 of the head 128 abuts the pump body 124. From this position, the plug 120 is then forced further into the fuel flow passage 94. As the plug 120 is forced into the passage 94, the annular edge 134 deforms a portion 136 of the pump body 124 into the annular groove 122 to secure the plug 120 in the fuel flow passage 94, as shown in FIG. 6.

Figure 6:
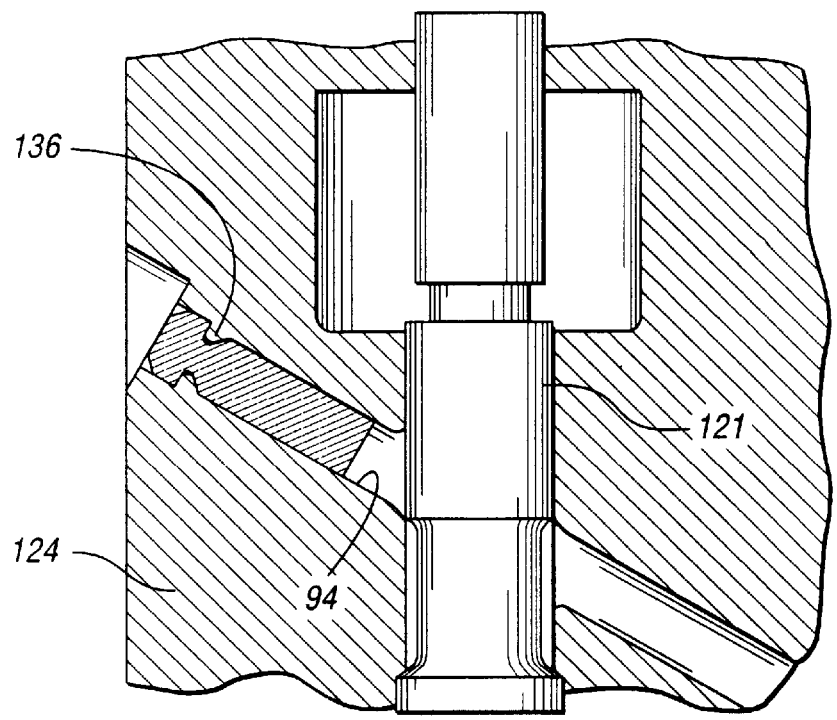
FIG. 6 shows an enlarged cut-away sectional schematic view of the assembly corresponding with FIG. 4b.
Figure 7:
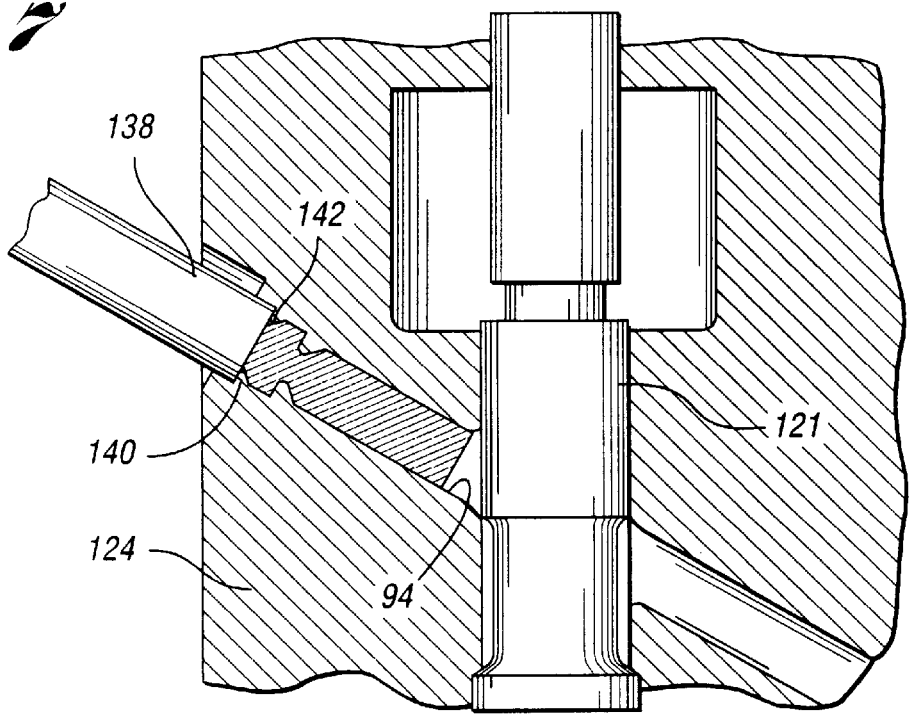
FIG. 7 shows an enlarged cut-away sectional schematic view of the assembly corresponding with FIG. 4c.

From the position illustrated in FIG. 6, the plug 120 is forced further into the passage 94, thus further deforming the portion 136 of the pump body 124 into the annular groove 122, as shown in FIG. 7.

For further retention the plug 120 is forced further into the annular passage 94, as shown in FIG. 7. The punch 138 preferably has a cross-sectional area approximately 20% greater than that of the flow passage 94, so that the punch 138 engages and deforms a portion 140 of the pump body 124 around the annular chamfer 142 of the head portion 128 of the plug 120.

Figure 8:
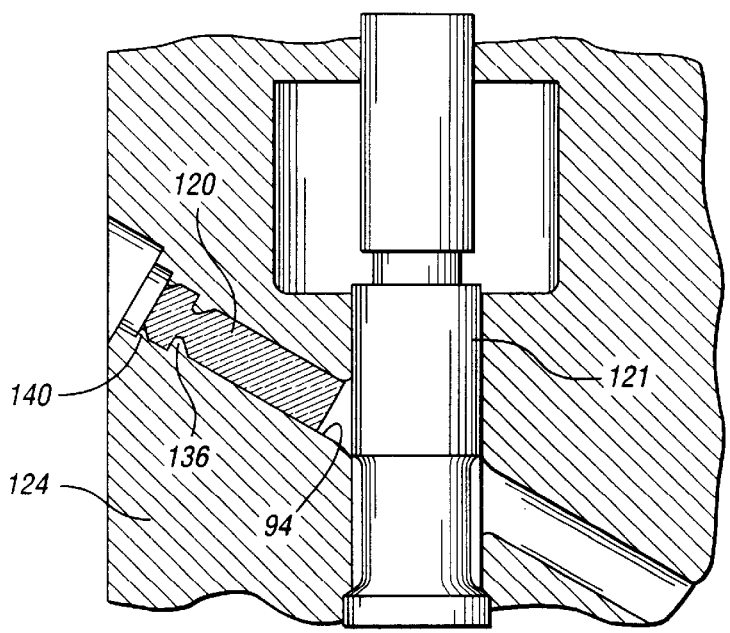
FIG. 8 shows an enlarged cut-away sectional schematic view of the final assembly after the punch is withdrawn from the position shown in FIG. 4c.
Figure 9A:
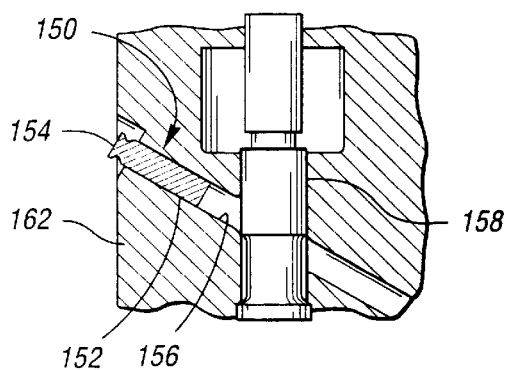
FIG. 9a shows a cut-away sectional schematic of an alternative plug inserted partially into the fuel flow passage.
Figure 9B:
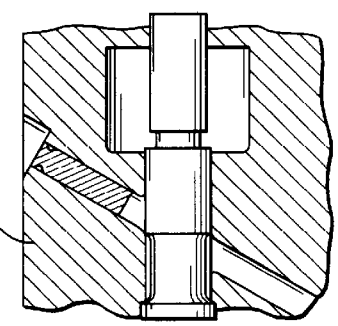
FIG. 9b shows a cut-away sectional schematic of the alternative plug fully inserted into the fuel flow passage.
Figure 9C:
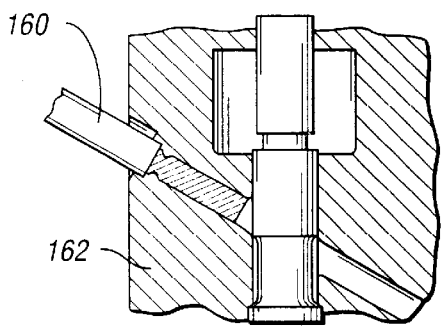
FIG. 9c shows a cut-away sectional schematic of the alternative plug punched into the fuel flow passage in a manner to deform a portion of the body into the annular groove.
Figure 9D:
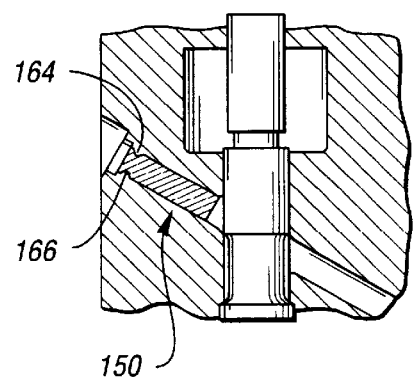
FIG. 9d shows a cut-away sectional schematic of the alternative plug after being punched into the fuel flow passage after the punch is removed.

As shown in FIG. 8, the punch 138 is then withdrawn, and the deformed portions 136 and 140 of the pump body 124 secure the plug 120 in position within the passage 94.

Figure 10:
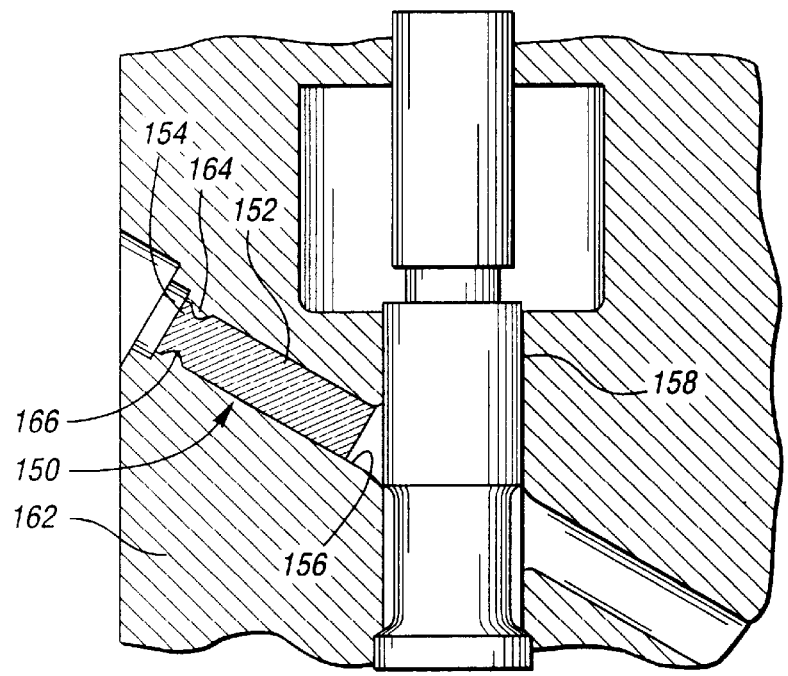
FIG. 10 shows an enlarged view of the assembly corresponding with FIG. 9d.

An alternative method of plugging a fuel flow passage is illustrated in FIGS. 9 through 10. In this embodiment, the plug 150 includes a shaft portion 152 and head portion 154 of substantially equal cross-sectional area. The shaft portion 152 and head portion 154 have a slip-fit relationship with the fuel flow passage 156. As shown in FIGS. 9a–d, the plug 150 is inserted into the passage 156 adjacent the control valve 158, and slid to a position where the head portion 154 is substantially flush with the opening of the passage 156. The punch 160, which has a cross-sectional area approximately 20% greater than that of the head portion 154, then engages the plug 150 and pump body 162, as shown in FIG. 9c, in a manner to deform a portion 164 of the pump body 162 into the annular groove 166 formed between the shaft and head portions 152,154, thereby securing the plug 150 within the passage 156.

Figure 11:
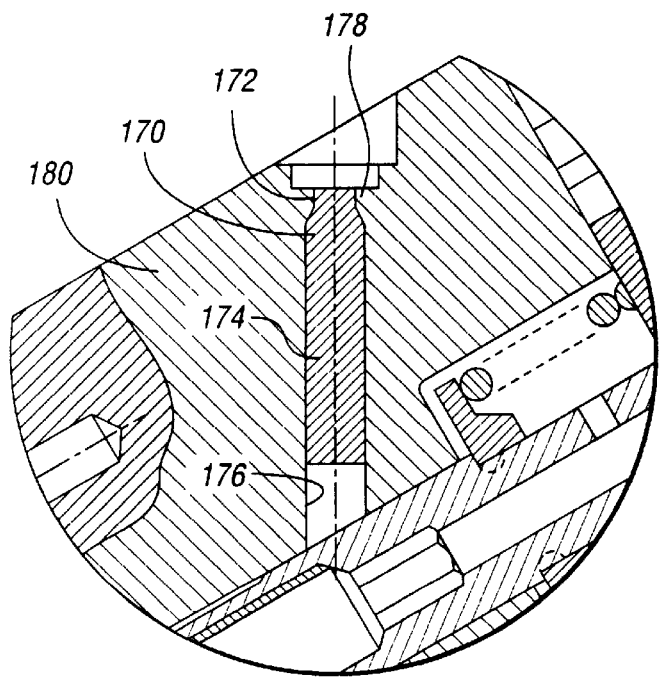
FIG. 11 shows a cut-away sectional view of a second alternative plug swaged into a fuel injector pump body fuel flow passage.

FIG. 11 illustrates another method of plugging a fuel flow passage in accordance with the present invention. In this embodiment, the plug 170 includes only a neck portion 172 and shaft portion 174. The plug 170 is inserted into the passage 176, and a portion 178 of the pump body 180 is deformed around the neck portion 172 by a punch in a manner to secure the plug 170 within the passage 176.

While the best modes for carrying out the invention have been described in detail, those familiar with the art to which this invention relates will recognize various alternative designs and embodiments for practicing the invention within the scope of the appended claims.

What is claimed is:

1. A method of plugging a fuel flow passage in a fuel injector pump body, the fuel flow passage having a passage width, the method comprising:

providing a plug having a shaft portion with a shaft width slightly less than the passage width, a head portion having a head width greater than the passage width, and a neck portion forming an annular groove between the head and shaft portion, said head portion forming an annular edge therearound adjacent the neck portion, and providing an annular chamfer on the head;

inserting the shaft portion into the passage; and forcing the plug into the passage in a manner to cause the annular edge to deform a portion of the pump body into the annular groove to secure the plug in the passage.

2. The method of claim 1, further comprising:

providing a punch having a punch width greater than the head width; and forcing the punch toward the plug in a manner to deform a further portion of the body around the annular chamfer to further secure the plug in the passage.

* * * * *